United States Patent

Bromley

Patent Number: 5,916,497
Date of Patent: Jun. 29, 1999

[54] MANUFACTURING OF CERAMIC ARTICLES

[75] Inventor: Anthony Philip Bromley, Leeds, United Kingdom

[73] Assignee: British Nuclear Fuels plc, Warrington, United Kingdom

[21] Appl. No.: 08/849,330

[22] PCT Filed: Dec. 14, 1995

[86] PCT No.: PCT/GB95/02915

§ 371 Date: Jun. 24, 1997

§ 102(e) Date: Jun. 24, 1997

[87] PCT Pub. No.: WO96/18999

PCT Pub. Date: Jun. 20, 1996

[30] Foreign Application Priority Data

Dec. 16, 1994 [GB] United Kingdom .................. 9425474

[51] Int. Cl.[6] .................................................. G21C 21/00
[52] U.S. Cl. ................................ 264/5; 264/628; 264/642
[58] Field of Search ............................... 264/5, 628, 642; 156/89

[56] References Cited

U.S. PATENT DOCUMENTS

| 3,823,067 | 7/1974 | Stern et al. | 176/66 |
| 4,199,404 | 4/1980 | Mordarski et al. | 176/66 |
| 4,382,048 | 5/1983 | Harlow | 264/5 |

FOREIGN PATENT DOCUMENTS

| 0277708 A3 | 1/1988 | European Pat. Off. |
| 1397014 | 4/1973 | United Kingdom . |
| 1446067 | 10/1973 | United Kingdom . |
| 2177249 | 7/1985 | United Kingdom . |
| 2098787 | 5/1992 | United Kingdom . |

*Primary Examiner*—Christopher A. Fiorilla
*Attorney, Agent, or Firm*—Sheridan Ross P.C.

[57] ABSTRACT

A method of manufacturing a ceramic article includes the steps of: forming a body of particulate ceramic material having two end portions, a length and a middle portion, wherein a bulk particle density of each of the two end portions is less than a bulk particle density of the middle portion; compressing the body at opposing ends of the body; and thereafter sintering the body to form the ceramic article. The invention may be adapted for production of nuclear fuel pellets.

11 Claims, 2 Drawing Sheets

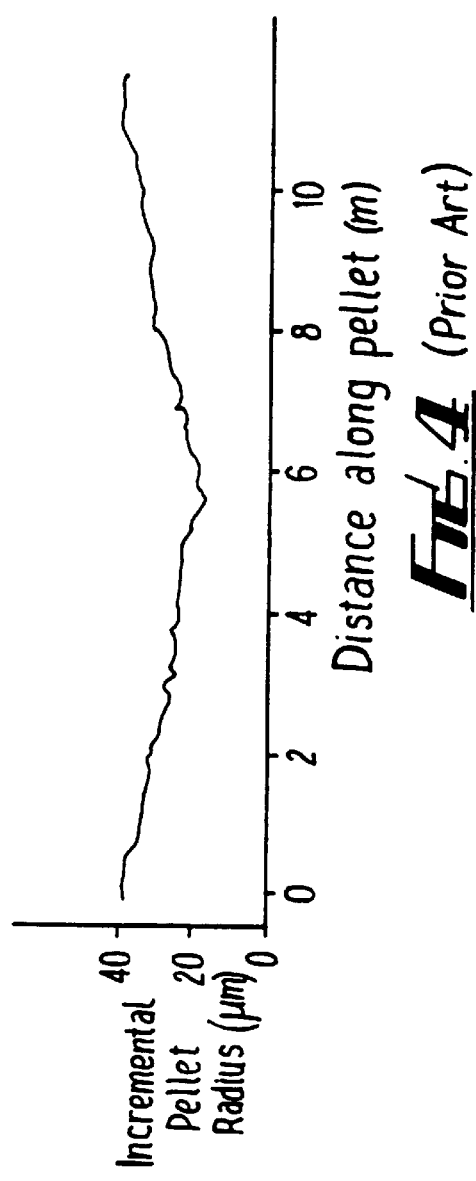
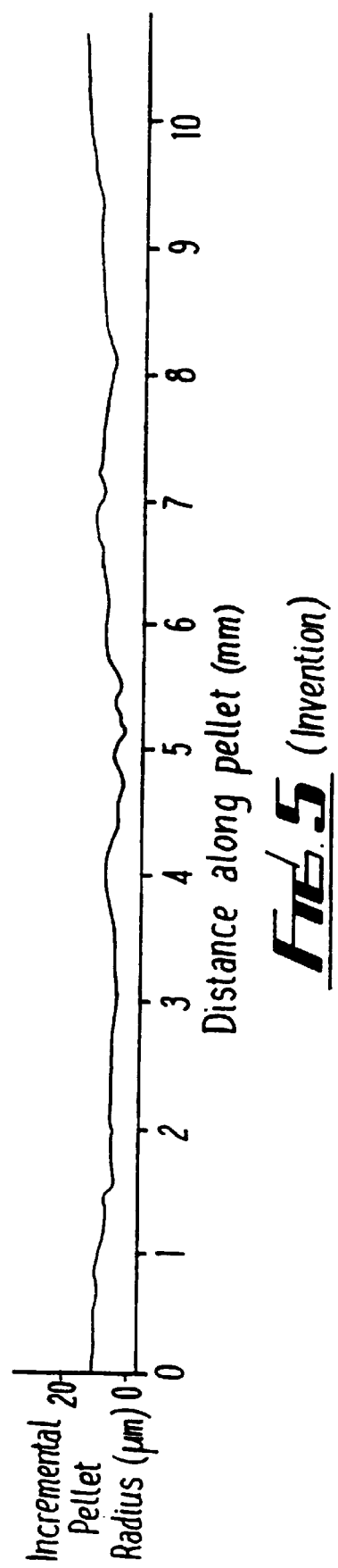

MANUFACTURING OF CERAMIC ARTICLES

FIELD OF THE INVENTION

The present invention relates to the manufacture of ceramic articles and, particularly but not exclusively, to the manufacture of ceramic pellets such as nuclear fuel pellets.

BACKGROUND OF THE INVENTION

In general, when a particulate material is compacted in a die, particle-particle friction and die-wall-particle friction result in variations in the applied pressure in the particulate body and, in consequence, the compacted body has a non-uniform pressed density. The non-uniform pressed density of the compact gives rise to a differential shrinkage during subsequent sintering, resulting in distortion of the ceramic article. Even when sintering is not accompanied by shrinkage, the non-uniformity of density remains in the sintered component and is a source of weakness.

Nuclear fuel pellets are ceramic substantially cylindrical solid or hollow bodies which are composed mainly or wholly of an oxide of uranium, especially $UO_2$. Collections of such pellets are used together in a sheath providing a fuel rod or pin. Assemblies of such rods or pins are employed as the active elements in a nuclear reactor.

In a conventional process for the manufacture of nuclear fuel pellets, a uranic oxide powder, eg manufactured in the manner described in EP 0277708, is compacted or compressed in a die or mould and then sintered usually over a period of several hours at least, usually in a reducing atmosphere at elevated temperatures, eg 1500° C. to 1800° C.

It is desirable for the pellets to be produced with a body shape which is a right circular cylinder. Product specifications normally require such a shape. However, pellets produced in the conventional manner described above may not, after sintering, be obtained with a right circular cylindrical shape even though the cavity of the die or mould used to form the pellet shape is itself a perfect right circular cylinder. The pellets are often produced with a shape which has a body waist in a wheatsheaf-like profile, ie the cross-sectional area (perpendicular to the pellet axis) taken at different points along the length of the pellet is less near the middle of the pellet than near the ends of the pellet. Grinding of the pellets is normally required after sintering to meet product specifications. Such grinding is both time consuming and costly.

SUMMARY OF THE INVENTION

The purpose of the present invention is to reduce or eliminate the need for such grinding following sintering.

According to the present invention there is provided a method of manufacturing a ceramic article including the steps of forming a body of particulate material, compressing the body at its ends and sintering the body and characterised in that the body is formed, prior to compression, of particulate material layers of different bulk particle density.

The ceramic article may comprise a ceramic pellet having a substantially cylindrical shape.

The ceramic pellet may comprise a nuclear fuel pellet and the particulate material may comprise nuclear fuel material.

We have found by experimental analysis that the wheatsheaf shaped profile obtained in the prior art is caused by sintering a green pellet having a density which is less in its interior region than at its ends. This differential density profile is caused in the following way. In the usual method of pressing a green pellet from a powder, the powder is introduced into a right circular cylindrical die cavity and the powder is compressed at its ends. Owing to friction effects within the powder body, there is a variation in load experienced by different regions within the body and a slight barrelling of the pellet body occurs near the middle of the pellet. The barrelled region has a lower density than the end regions of the body because the same particles occupy a greater volume.

By employing regions of particulate material having different densities prior to compaction in accordance with the present invention the reduction in density caused upon compaction by the aforementioned barrelling effect is compensated for and a compact having a more uniform density distribution is obtained. This in turn provides, upon sintering, a sintered pellet having a more uniform cross-sectional body shape.

In the method according to the present invention the body of particulate material may be formed by introducing powder or particles of the nuclear fuel material into a mould or die cavity having a substantially right circular cylindrical shape.

The said body may prior to compaction comprise discrete layers having different densities. Such layers may have interfaces which are substantially planar, eg in a plane orthogonal to the axis of the body. Alternatively, the layer interfaces may be non-planar eg convex or concave to provide a suitable density profile.

Alternatively, the density change in the said body prior to compaction may take place gradually, eg linearly with distance, over a portion of the length of the body.

The said body prior to compaction desirably includes regions at the ends of the body which have a density less than that in the interior region ie near the middle of the body.

The different densities in the said body may be achieved by the introduction of particulate material into a die or mould cavity from a plurality of sources containing different particulate materials providing different bulk densities, the release of material from the two sources being controlled so as to give the required density profile in the body. The different particulate materials may comprise for example materials of the same composition but which have been treated differently or which have different particle morphology. The different particle types may comprise, for example, (a) particles produced from a single powder but pre-compacted using different pressures to form different density granules, or (b) particles of the same powder which have on the one hand been milled and on the other hand have not been milled or (c) particles which on the one hand have a plate-like morphology and on the other hand, have a sphere-like morphology or (d) combinations of these different types.

Where granulation is employed to produce different density granules various known granulation methods may be used for the production of granules one or more of the different density types. For example, pre-compaction in a die followed by breaking through a sieve may be employed. Alternatively, roll compaction may be employed.

The body of particulate material, eg produced in one of the ways described, may comprise uranium dioxide which may contain optional additives, eg niobia or gadolinia, or plutonium dioxide (eg up to 6 percent by weight) to provide a mixed oxide (MOX) fuel pellet. The particles may also be coated with a small quantity, eg less than 1 percent by weight, of a solid lubricant such as zinc stearate which has been employed in a pre-treatment process or is used in the compaction step, to treat the powders from which the body is formed (directly or indirectly as pre-compacted particles).

The pre-compaction and sintering steps in the method according to the present invention may be carried out in a manner similar to that employed in the prior art although the pressure in the compaction step may be increased with time gradually to a maximum, eg 6–7 tonnes per $cm^2$.

The maximum compaction pressure may be from 1 to 10 $Te/cm^2$. The sintering step may be carried out as in the prior art in an inert gas atmosphere or in a reducing atmosphere, eg hydrogen or a mixture of hydrogen and an inert gas containing up to 99% percent by weight of hydrogen. The sintering step may be carried out for at least one preferably several hours, eg >5 hours, at a temperature in the range 1500° C. to 1800° C. A pressure of greater than one atmosphere is desirably applied during the sintering step.

The present invention beneficially and unexpectedly allows ceramic, eg nuclear fuel, pellets to be produced which in profile have sides which are more straight than those obtained immediately after sintering in the prior art. The need for costly post-sinter grinding is thereby reduced or eliminated.

Although the present invention is primarily intended for the production of ceramic, eg nuclear fuel, pellets which in axial cross-section are straight sided pellets having grooves in their curved surfaces or barrel-shaped pellets required for particular applications may also be produced using the invention.

The pellets produced by the present invention may be substantially all solid. Alternatively the pellets may include an axial hole therethrough. The ends of the pellet may be flat or curved, eg convex. The exact shape of the pellet will be as usually specified for the particular type of nuclear reactor (eg AGR or LWR) in which such pellets are to be used in assemblies of fuel rods or pins.

BRIEF DESCRIPTION OF THE FIGURES

Embodiments of the present invention will now be described by way of example with reference to the accompanying drawings, in which:

FIGS. 4 and 5 are plots which are actual measured profiles of pellets made respectively as in the prior art and by the invention.

DETAILED DESCRIPTION OF THE INVENTION

Figure 1:
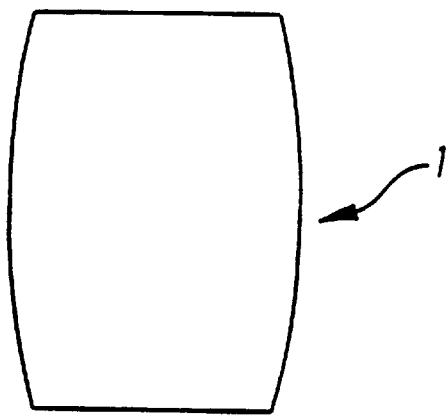
FIG. 1 is a schematic profile of a green (pre-sintered) pellet produced as in the prior art.
Figure 2:
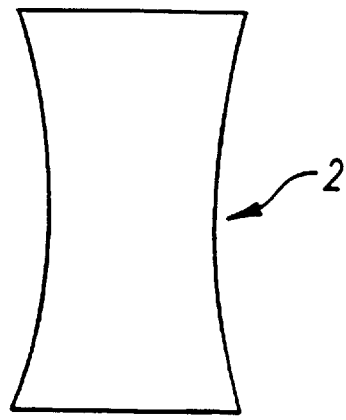
FIG. 2 is a schematic profile of a sintered pellet produced as in the prior art.

As shown in FIG. 1, a pellet profile having a barrel shape 1 is produced by compressing a homogenous $UO_2$ or $UO_2$-based powder in a die or mould cavity of right circular cylindrical cross-section in the conventional manner described above. Upon sintering of the compressed pellet, a pellet of wheatsheaf-like shape 2 is formed as shown in FIG. 2. The diameter at the waist of the shape 2 may for example by typically 50 $\mu$m (ie 25 $\mu$m at each side) less than that at the ends of the pellet for a pellet having dimensions of about 6 mm (diameter) by 10 mm (length).

Figure 3:
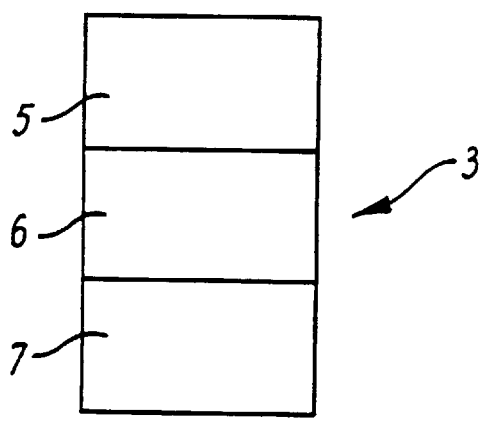
FIG. 3 is a schematic profile of a pellet produced by the method of the present invention.

FIG. 3 shows a pellet profile as obtained by using the method of the present invention. A right circular cylindrical pellet body shape 3 is formed by compressing a $UO_2$ or $UO_2$-based powder having three regions 5, 6, 7. In regions 5 and 7 at the ends of the pellet body the density of particles is $d_1$, and in the region 6 at the middle of the pellet body the density is $d_2$. The density $d_2$ may be three times greater than $d_1$ for regions 5, 6 and 7 of equal depth when the compaction pressure is 2 tonnes/$cm^2$.

When the pellet shown in FIG. 3 is sintered in a conventional way, eg as described in the following example, a sintered pellet profile substantially the same as the shape 3 is obtained.

The following illustrative example demonstrates the benefit of the invention as compared with the prior art.

Ceramic grade uranium dioxide powder manufactured by the Applicants was used in the experiments. Two types of granules, Type A and Type B, were prepared from the same $UO_2$ powder as follows.

Type A: Powder was poured into a steel die of diameter 2.54 cm and pressed at a pressure of 0.25 tonnes $cm^{-2}$ to form a disc shaped powder compact of thickness approximately 1 cm. The compact was then broken through a #14 mesh sieve with orifice size 1.2 mm to produce granules. The resultant granules were placed in a glass jar and 0.2 wt % zinc stearate added. The zinc stearate acts as a lubricant during die pressing. The jar was then placed on rollers and tumbled for 10 minutes to improve granule flowability and mix in the stearate.

Type B: These granules were prepared in exactly the same manner as Type A except that they were pressed at 0.75 tonnes $cm^{-2}$.

The granules were then pelleted as follows:

Experiment 1 (prior art): 8 g of granules of Type B were poured into a right cylindrical die cavity with diameter 11 mm and then pressed with a pressure of 2 tonnes $cm^{-2}$. The resulting compact was then fired under the following conditions: heating rate 5 C/min ramp rate to 300 C and then a 20 C/min ramp rate up to 1750 C, held at 1750 C for 5 hours and then cooled at 20 C/min. The atmosphere used was pure hydrogen with 0.5 volume % carbon dioxide at a flow rate through the furnace of 10 /min. No pressure was applied during firing. The fired pellet side profile was then measured on a stylus profile measuring device. The result of profiling is shown in FIG. 4 which clearly shows the previously described 'wheatsheaf' effect. In FIG. 4, the vertical axis represents pellet radius variation from an arbitrary datum value, as profiled on one side of the pellet and the horizontal axis represents pellet length in distance from an arbitrary point, as measured along the same side of the pellet.

Experiment 2 (invention): 3 g of granules of Type A were first placed in the die cavity and the die lightly tapped to ensure the granules lay level. 2 g of granules of Type B were placed on top of the Type A granules and again the die tapped. Finally 3 g of granules of Type A were laid on top of the Type B layer. The granules were then pressed, fired and measured as in Experiment 1 above. The resultant fired pellet profile shown in FIG. 5 is much improved in comparison to the profile obtained by the prior art procedures as illustrated in FIG. 4. As in FIG. 5, the vertical axis represents pellet radius variation and the horizontal axis represents distance along the pellet both as profiled along the side of the pellet.

While the various embodiments of the present invention have been described in detail, it is apparent that various modifications and adaptations of those embodiments will occur to those skilled in the art. It is expressly understood, however, that such modifications and adaptations are within the scope of the present invention as set forth in the following claims.

What is claimed is:

1. A method of manufacturing a ceramic article including the steps of:

forming a body of particulate ceramic material, said body having two end portions, a length, and a middle portion, wherein a bulk particle density of each of the two end portions is less than a bulk particle density of the middle portion;

compressing the body at opposing ends of the body; and thereafter sintering the body to form the ceramic article.

2. A method in claim 1 wherein the ceramic article comprises a ceramic pellet having a substantially cylindrical shape.

3. A method as in claim 2 wherein the ceramic pellet comprises a nuclear fuel pellet and the particulate material comprises nuclear fuel material.

4. A method as in claim 1, wherein the body of particulate material is formed by introducing powder or particles of the particulate material into a mould or die cavity having a substantially right circular cylindrical shape.

5. A method as in claim 1 wherein said body, prior to compression, comprises discrete layers each having a different density.

6. A method as in claim 5 wherein said body has an axis and wherein said layers have interfaces which are substantially planar in a plane orthogonal to said axis.

7. A method as in claim 5 wherein said layer interfaces are non-planar.

8. A method as in claim 1 wherein a density change in said body takes place gradually over at least a portion of said length of said body prior to said step of compressing.

9. A method as in claim 1 wherein the particulate material in an end portion has a different mean particle size than the particulate material in the middle portion.

10. A method as in claim 1 wherein said different bulk particle densities in said body are achieved by the introduction of particulate material into a die or mould cavity from a plurality of sources containing different particulate materials of different bulk particle densities.

11. A method as in claim 1 wherein said particulate material layers comprise materials of the same composition but which have been treated differently or which have different particle morphology.

* * * * *